Aug. 25, 1925.
E. K. BARNES
1,551,001
SWITCH
Filed April 18, 1922
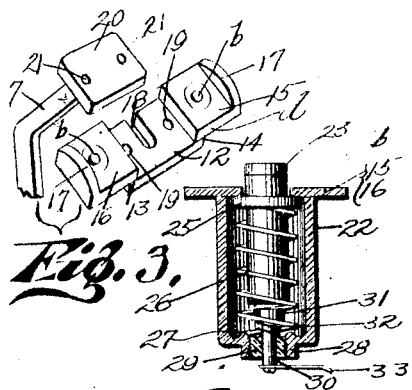
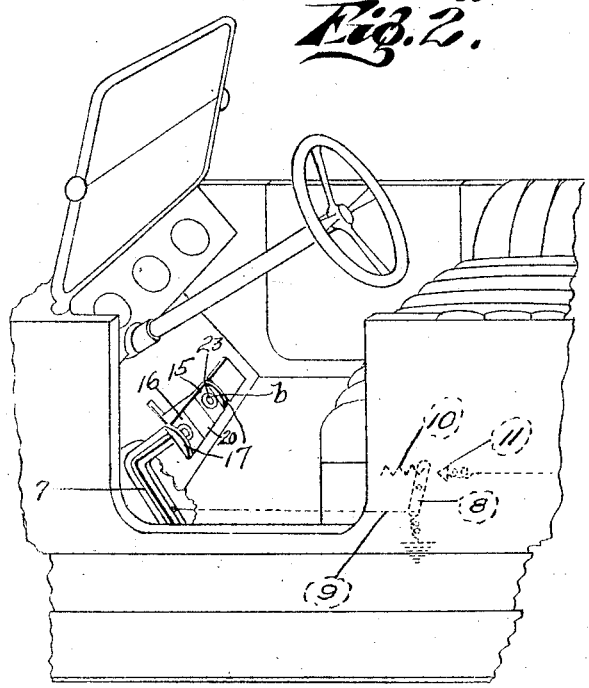
INVENTOR,
Everitte K. Barnes;
BY
ATTORNEY.

Patented Aug. 25, 1925.

1,551,001

UNITED STATES PATENT OFFICE.

EVERITTE K. BARNES, OF CASA VERDUGO, CALIFORNIA.

SWITCH.

Application filed April 18, 1922. Serial No. 554,782.

*To all whom it may concern:*

Be it known that I, EVERITTE K. BARNES, a citizen of the United States, residing at Casa Verdugo, in the county of Los Angeles and State of California, have invented new and useful Improvements in Switches, of which the following is a specification.

This invention relates to switches, and has for an object the provision of a switch which when incorporated in motor vehicles will permit a setting of direction signals to warn pedestrians of a turning movement of a vehicle without the necessity of the operator of said vehicle removing his hands from the steering wheel or operating any switch members by the hands.

Where signals are used on vehicles for indicating a turning or stopping of a vehicle, most of said signals are operated by means of a switch either on the steering post or steering wheel, and it is necessary to remove the hand from the steering wheel in order to so operate said signals. Oftentimes a person forgets to operate the signal and unless the arm is used for indicating movement of the vehicle, collisions often result. One of the prime essentials of this invention relates to automatically setting the signal members carried by the vehicle by a simple movement of the foot of the operator. In practicing the invention, three switches may be utilized in connection with either the brake pedal or the clutch pedal, and an inward movement, for instance, to throw out the clutch would operate one signal, such as "Slow" or "Stop," while a slight movement of the foot to the left or right while engaging the pedal would operate switches to indicate a turning movement of the vehicle to the right or left. It will be appreciated that the foot may at all times rest upon the clutch or brake pedal, that it is unnecessary to remove the foot therefrom, and that the switches may be operated by a slight raising or turning of the foot to actuate certain of the switch members. This operation would become almost automatic and is far superior to use of hand-operated switches.

The invention has for further objects the provision of an improved signaling switch, which will be superior in point of relative simplicity and inexpensiveness, taken in conjunction with utility, durability and general efficiency and serviceability.

With the above and other objects in view, the invention consists in the novel and useful provision, formation, construction, combination, association and inter-relation of parts, members and features, as illustrated in some of its embodiments in the accompanying drawing, described in the following statement, and finally pointed out in claims.

In the drawing:

Figure 1 is a fragmentary perspective view showing the clutch member with the switch members carried thereon;

Figure 2 is a fragmentary cross sectional view showing one of the switch members adapted to be associated with the brake or clutch pedal; and Figure 3 is a fragmentary perspective view of a member for attachment with a pedal of the vehicle, said member carrying certain of the switches.

Corresponding parts in all the figures are designated by the same reference characters.

Referring specifically to the drawing, the signaling which is designated as an entirety and in one embodiment as A, and of which *b* are switch members. The switch members *b* are adapted to be actuated by the foot of the driver of a vehicle and the switch members may be an integral part of the pedal or they may be in the form of an attachment to be joined to the pedal. In Figure 1 the clutch pedal 7 has been selected and a pivoted arm 8 has a cord 9 connected to an end thereof, with the opposite end of the cord connected to the arm of the clutch pedal. The opposite end of the arm 8 has a spring 10 connected thereto, which normally keeps the arm 8 from contacting with a contact point 11. When the clutch pedal is pushed inwardly the cord 9 pulls the arm 8 and causes one end thereof to contact with the point 11, which may operate a stop signal. Either attached to or integrally formed with the foot tread of the pedal are two more switch members. Assuming that an attachment is used, a form such as shown in Figure 3 may be provided, and which consists essentially of a plate *d* having a central portion 12 provided at its ends with two upstanding walls 13 and 14 with outwardly extending portions 15 and 16 joined with said walls and extremities of said outwardly extending portions having flanged parts 17 acting as foot guards. The central portion 12 is provided with a slot or groove 18, and likewise provided with transverse perforations 19. The gap between the walls 13 and 14 is equal in width to the width of the foot tread 20 of the pedal 7. The foot tread is provided with threaded perforations 21 which align with the perforations 19 in the central portion 12, and the pedal arm is adapted to be received within the groove 18 of the member $d$ with the foot tread received upon the central portion and confined between the walls 13 and 14, whereupon screws are passed through the perforations 19 and engage the threaded walls surrounding the openings 21. The portions 15 and 16 each carry a switch $b$, such as that illustrated in Figure 2. In particular a switch consists of a cylindrical casing 22 connected to the under surface of the members 15 and 16 with a cylindrical push button 23 extending within the cylindrical casing 22 and projecting through an opening 24 in the parts 15 or 16. A flanged collar 25 surrounds the push button 23, and beneath such flanged collar and bearing against the same and surrounding the cylindrical button 23, is a coil spring 26. One end of said coil spring normally rests in an annular concavity 27 in the bottom of the cylindrical casing 22, and whereby the button 23 is normally urged outwardly through the opening 24. The member 22 is provided with a reduced annular flanged portion in the base thereof, as shown at 28, and the interior of said flanged portion is screw-threaded for reception of a threaded insulating plug 29. An arm 30 projects through the opening in said plug, and carries at an end thereof a contact point or head 31, and a coil spring 32 normally surrounds the arm 30 and bears against the under surface of the contact point 31, and likewise against the plug 29. Normally there is a gap between the contact point 31 and the cylindrical button 23. Pressure exerted downwardly upon the button 23 will cause an end thereof to contact with the member 31.

A device of this character is simple, but is positive in its results, as operation of the switches becomes almost automatic after a time. The foot does not of necessity have to leave the clutch pedal or the brake pedal, and the arms and hands of the operator are left free for purposes other than the actuation of some switch for indicating a turning movement of the vehicle. Obviously many forms of switches may be used, the precise construction of the switch and its method of attachment to the pedal might be varied in many respects, or as pointed out, the device might be an integral part of the pedal and not a mere attachment. In place of a push button form of switch a pivoted arm might be utilized on each side of the pedal tread, and all that would be required of the operator would be to shift the foot so as to engage the arm and move the same, but a modification of this kind is simply a matter of preference. My invention consists essentially in providing a switch which incorporates three switches, one operating responsive to movement of the pedal, while the other two operate responsive to pressure or contact with the foot of the operator, all of said switches being associated with the brake lever or the clutch lever of the vehicle.

It is obvious that various changes and modifications and variations may be made in practicing the invention, in departure from the particular description, all of said modifications being made, however, within a fair interpretation of the invention as defined by the scope of the appended claims.

Having thus disclosed my invention, I claim and desire to secure by Letters Patent:

1. In a device of the character disclosed, a plate formed with a depressed portion, said depressed portion being provided with a slot, and sides of such plate bounding the depressed portion being provided with electrical switch members.

2. The combination with a vehicle pedal member having the usual lever arm and foot pedal, of a member for joinder with such foot pedal, said member comprising a plate formed with a depressed portion adapted to be secured to such pedal, and with extensions bounding such depressed portion, which extensions are adapted to lie in the same plane as the surface of such foot pedal.

3. The combination with a vehicle pedal member having the usual lever arm and foot pedal, of a member for joinder with such foot pedal, said member comprising a plate formed with a depressed portion adapted to be secured to such pedal, and with extensions bounding such depressed portion, which extensions are adapted to lie in the same plane as the surface of such foot pedal; said extensions being provided with electrical switch members.

4. The combination with a vehicle pedal member having the usual lever arm and foot pedal, of a member for joinder with such foot pedal, said member comprising a plate formed with a depressed portion adapted to be secured to such pedal, and with extensions bounding such depressed portion, which extensions are adapted to lie in the same plane as the surface of such foot pedal; said extensions being provided with electrical switch members and being formed with flanges.

In testimony whereof, I have signed my name to this specification.

EVERITTE K. BARNES.